United States Patent [19]

Yanagisawa

[11] Patent Number: 5,031,055
[45] Date of Patent: Jul. 9, 1991

[54] DATA STORAGE APPARATUS WITH HEAD DISPLACEMENT SENSOR

[75] Inventor: Masahiro Yanagisawa, Tokyo, Japan

[73] Assignee: NEC Corporation, Japan

[21] Appl. No.: 259,050

[22] Filed: Oct. 18, 1988

[30] Foreign Application Priority Data

Oct. 20, 1987 [JP] Japan .................................. 62-265636
May 13, 1988 [JP] Japan .................................. 63-116600

[51] Int. Cl.$^5$ ............................................. G11B 17/32
[52] U.S. Cl. ..................................... 360/75; 360/103; 369/14
[58] Field of Search .................... 360/75, 77.03, 78.11, 360/103, 102, 105, 107, 109, 135; 369/14; 318/640, 638, 676

[56] References Cited

U.S. PATENT DOCUMENTS

| | | | |
|---|---|---|---|
| 3,614,579 | 10/1971 | Fulton | 360/75 |
| 3,632,900 | 1/1972 | Kurzweil et al. | 360/75 |
| 3,706,861 | 12/1972 | Giel | 360/75 |
| 4,605,977 | 8/1986 | Matthews | 360/75 |
| 4,853,810 | 8/1989 | Pohl et al. | 360/103 |

FOREIGN PATENT DOCUMENTS 58-121177 7/1983 Japan .................................. 360/103
61-172283 8/1986 Japan .................................. 360/109

OTHER PUBLICATIONS

IBM TDB, vol. 12, No. 7, "Electrostatically Loaded Slider Bearing", Lin et al., 12/69, p. 959.

Primary Examiner—Vincent P. Canney
Assistant Examiner—Steven R. Garland
Attorney, Agent, or Firm—Laff, Whitesel, Conte & Saret

[57] ABSTRACT

A data storage apparatus has a magnetic head opposed to a magnetic recording medium and movable relative to the medium so as to magnetically write or read data to or from the medium. A displacement sensor monitors a distance between the head and the medium. An actuator which supports the head is driven according to the monitored results so as to maintain constantly the distance. The actuator includes a vibrator for vibrating the head at a given frequency effective to produce air pressure against the medium. The head has a bottom face opposed to the medium and convexed outwardly toward the medium, and the medium is made of elastic material concavedly deformable in response to the air pressure.

8 Claims, 2 Drawing Sheets

DATA STORAGE APPARATUS WITH HEAD DISPLACEMENT SENSOR

BACKGROUND OF THE INVENTION

The present invention relates to an apparatus for magnetically storing and retrieving data to and from memory medium.

There is known data storage apparatus having a magnetic head (hereinafter referred to as "head") for magnetically writing and reading data onto and from magnetic memory medium (hereinafter referred to as "medium") such as magnetic tape, magnetic card, flexible disk and hard magnetic disk (hereinafter referred to as "hard disk"). It is necessary to reduce the space between the medium and the head as small as possible in order to increase the recording density or capacity in the data storage apparatus. For this reason, a flying head is utilized to access the hard disk. The flying head is floated from the surface of the hard disk without contacting the hard disk surface by means of flying force due to air flow generated by the rotation of the hard disk.

The minimum spacing attained in the conventional apparatus of the type utilizing the flying head and the hard disk is about 0.2 micron. In addition, the hard disk is comprised of a substrate composed of hard material such as aluminum alloy, aluminum alloy covered with nickel-phosphorus plating film, aluminum alloy covered with alumina, glass, and ceramics so as to reduce waviness and roughness of the hard disk surface. A medium layer and a protecting layer are also flatly and smoothly formed on the substrate. Further, a surface of the head opposed to the hard disk is finished to attain the evenness thereof and to reduce the roughness thereof.

For example, FIG. 2 shows a conventional data storage apparatus of Winchester type utilizing the flying head and the hard disk. The conventional apparatus comprises a hard disk 10 includes substrate 11 and a magnetic medium layer 12, a magnetic head 13, and a gimbal spring 14 for supporting the magnetic head 13.

In the conventional apparatus, the magnetic head tends to come into contact with the medium surface and therefore abraded (head clash) due to protrusion and dust on the medium surface. Moreover, when the rotation of the disk is suspended before starting and after driving, the flying force is not applied to the head to thereby cause friction-abrasion of the head surface. If the dimension of spacing between the head surface and the disk surface is set below the mean free pass of air (about 0.1 μm), collision probability of air particles to the head surface and the disk surface would be reduced to lose the effective flying force. Further, since the flying head surface is formed flat, an edge portion of the head occasionally comes into contact with the disk surface due to even slight inclination of the head to destroy the head and the magnetic medium layer. Such phenomena become more remarkable when the dimension of the spacing is set smaller. If the head surface is not formed flat or even, the dimension of the spacing between the head surface and the disk surface is apt to vary so as to thereby unstabilize the reading and writing of data and to thereby tend to apply concentrated load weight to the disk surface when the head comes into contact with the medium to destroy the magnetic medium layer and the head.

SUMMARY OF THE INVENTION

An object of the present invention is, therefore, to prevent the frictional abrasion of the head and the recording medium which would occur in the conventional data storage apparatus. According to one aspect of the present invention, a data storage apparatus comprises an actuator provided with a head for driving the head in the direction vertical to a recording medium surface and a displacement sensor for monitoring the space between the recording medium surface and the head, the actuator keeps the space constant to thereby maintain the slight spacing without contact between the head and the recording medium surface. Further, in order to prevent the contact of head edge with the medium surface, the head surface is outwardly curved and the recording medium is formed of elastic or deformable substrate and magnetic medium layer such that the recording medium is deformed by air pressure applied from the head to enlarge the effective spacing area. Moreover, the actuator is vibrated with high frequency to compress the air mass between the head and the medium surface to produce air pressure effective to maintain the head non-contact with the medium surface even during the deformation of the recording medium to thereby establish the slight space.

DESCRIPTION OF THE PREFERRED EMBODIMENTS

Hereinafter, embodiments of the invention will be described in detail in conjunction with the drawings.

Figure 1:
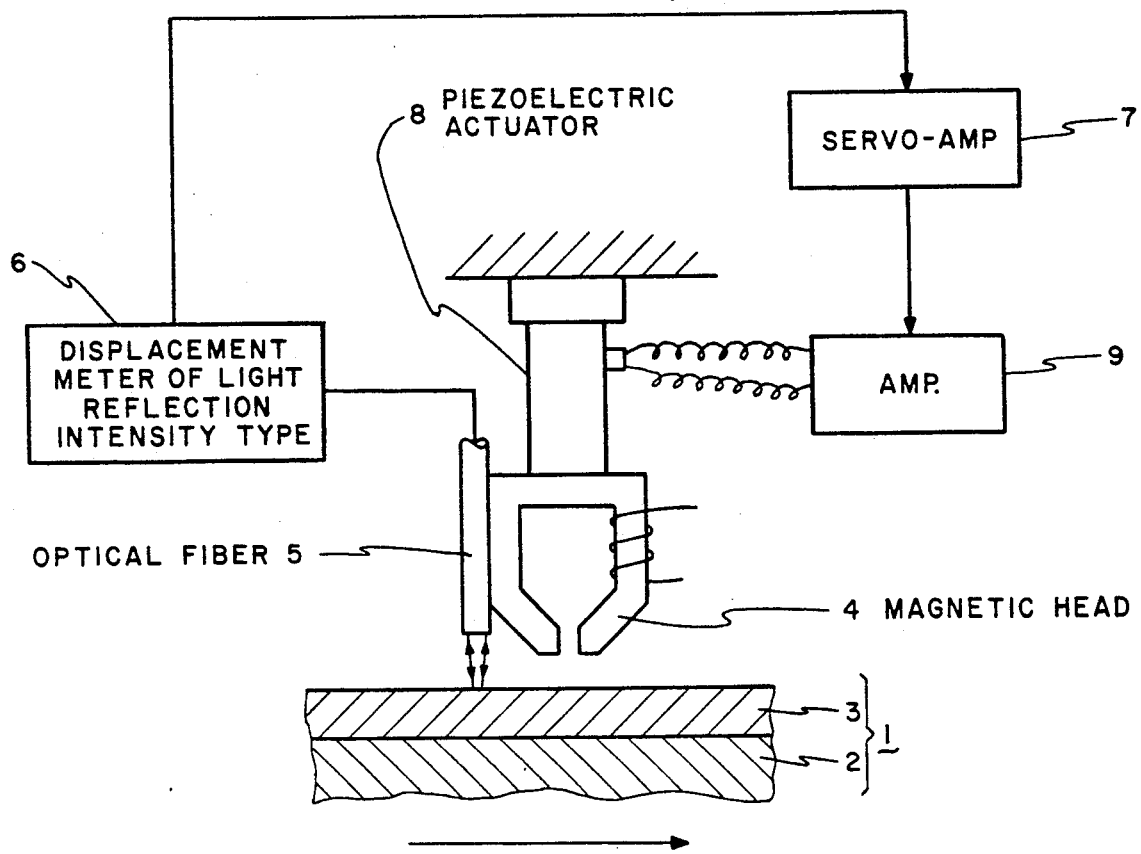
FIG. 1 is a block diagram showing an embodiment of the present invention.
Figure 2:
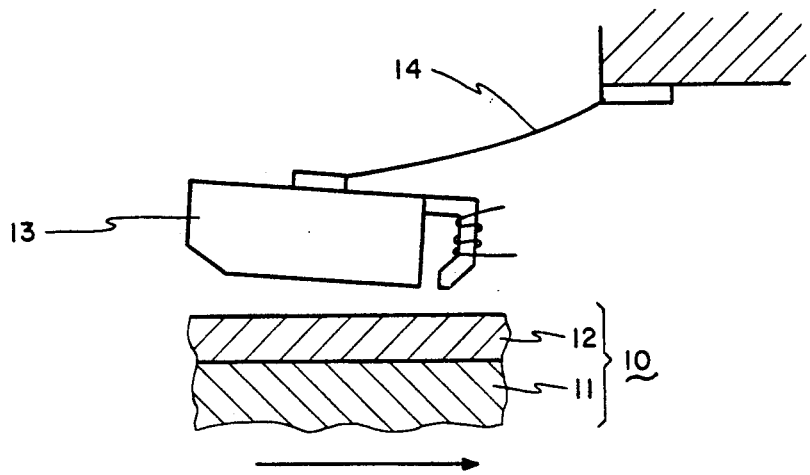
FIG. 2 is a partial sectional view of the conventional data storage apparatus of Winchester type.

Referring to FIG. 1, one embodiment of the invention includes a displacement measurement device 6 of the light reflection intensity type for emitting light and receiving the light reflected by the surface of a magnetic recording medium 1 and transmitted through an optical fiber 5 attached to a magnetic head 4 to detect the intensity change of reflected light to thereby monitor and measure the distance between the medium 1 and the head 4. The medium 1 is composed of an under-layer 2 and a recording medium layer 3. An piezoelectric actuator 8 is servo-controlled by a servo-circuit 7 and driven by an amplifier 9 in response to a displacement change signal fed from the displacement measurement device 6 which is representative of vertical displacement change of the head 4 relative to the medium surface. The actuator 8 enables the head 4 to follow the medium surface along a given track with keeping a predetermined slight space between the head and the medium surface. The displacement measurement device 6 of light reflection intensity type achieves measurement accuracy of about 40 Å in the case where the recording medium layer 3 or under-layer 2 is made of metal.

In this embodiment, a hard disk is utilized as the memory medium 1. The hard disk is comprised of a substrate (not shown) made of aluminum alloy, an under-layer 2 formed on the substrate and made of nickel and phosphorus, and a magnetic recording layer 3 made of cobalt nickel alloy and sputtered on the under-layer 2 to cover the same.

According to such structure of this embodiment, while the space between the head 4 and the medium 1 is monitored by a displacement sensor in the form of the optical fiber 5 and the light reflection intensity type displacement measurement device 6, the actuator 8 is driven to keep the space constant so as to maintain the slight spacing needed between the head 4 and the medium 1 without contact and with occasional application of very light weight load to the medium 1 from the head 4.

In addition, other types of displacement sensors than the light reflection intensity type 6 shown in FIG. 1 can be utilized in the invention, such as light interference type, electrostatic capacitance type, eddy current type displacement meter, laser-Doppler vibration meter and laser-Doppler flow rate meter. Also, other types of actuators than the piezoelectric actuator 8 shown in FIG. 1 can be utilized, such as electrostrictive actuator, magnetostrictive actuator and quartz crystal oscillator which may be oscillated at a frequency from 10 KHz to 100 MHz.

Figure 3:
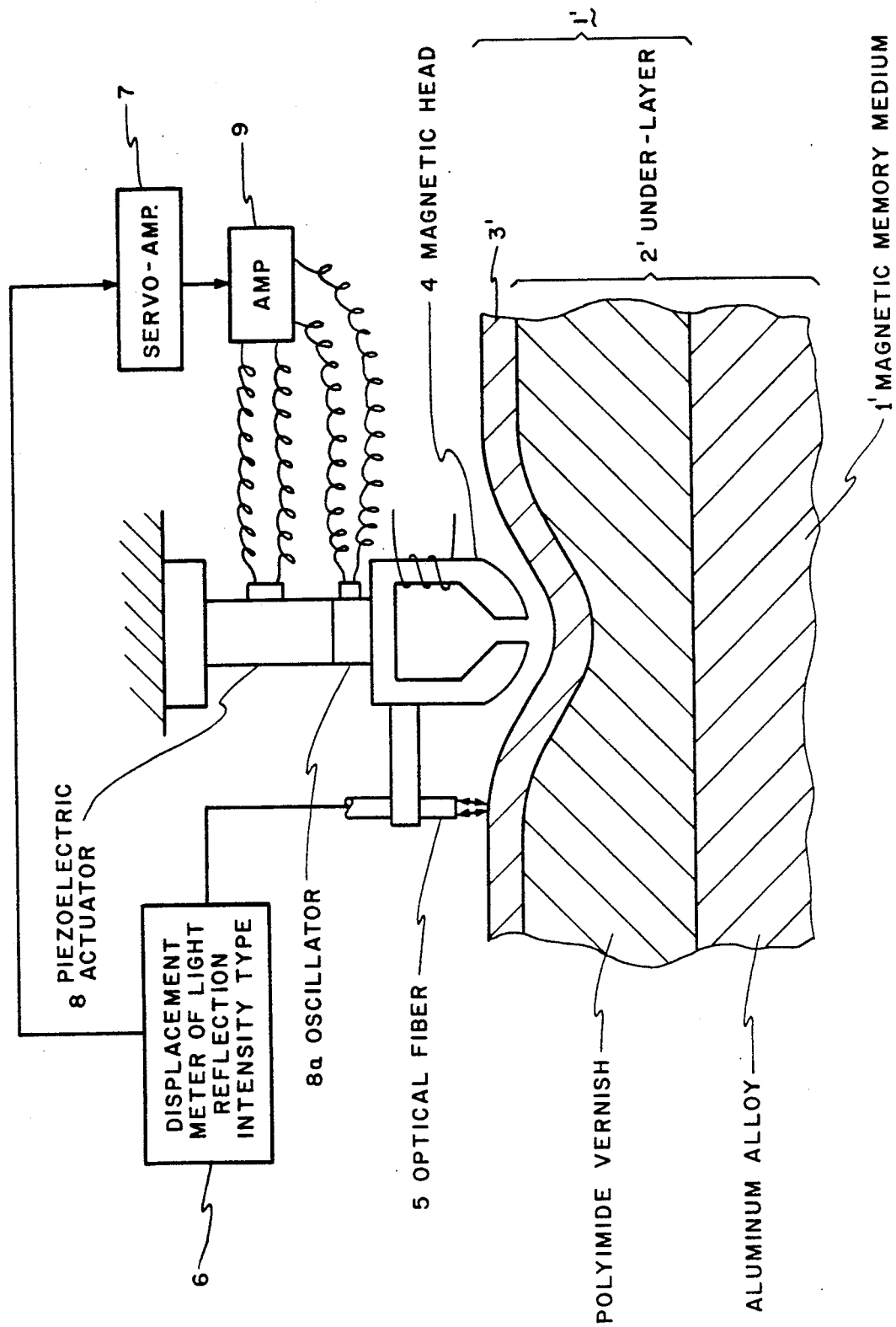
FIG. 3 is a block diagram showing another embodiment of the present invention.

Referring to FIG. 3, another embodiment of the invention comprises a magnetic recording medium 1' includes an under-layer 2' and a magnetic medium layer 3'. A displacement measurement device 6 of light reflection intensity type emits light and receives the light reflected from the surface of the magnetic recording medium 1' The reflected light is transmitted through an optical fiber 5 fixed to a magnetic head 4 so as to detect intensity change of the reflected light in order to measure and monitor the distance between the medium 1' and the head 4. A piezo-electric actuator 8 is servo-controlled by a servo-circuit 7 according to a displacement change signal fed from the displacement measurement device 6 based on the monitored reflected light intensity. The actuator 8 is driven by an amplifier 9 to enable the head 4 connected to the actuator 8 to follow the surface of the medium 1', with a constant and slight interval kept between the head 4 and the medium 1'.

An oscillating element 8a is interposed between the actuator 8 and the head 4. The element 8a undergoes vibration in the vertical direction for producing pressure between the head 4 and the medium 1' effective to elastically deform the surface of medium 1' away from an outwardly and downwardly curved bottom surface of the head 4. The element 8a thereby enables the head to follow the medium surface without physical contact to the medium surface. The displacement measurement device 6 of light reflection intensity type achieves the measurement accuracy of 40 Å order in the case that the magnetic medium layer 3' or under-layer 2' is made of metal.

The under-layer 2' is made of any elastic materials, for example, plastics such as polyester, polyimide, polyamide-imide, polyether-sulfone, polysulfone, aromatic polyether, epoxy resin, urea resin, melamic resin, polycarbonate, diallyl phthalate resin, acrylic resin, phenolic resin, polyphenylene sulfide, polyphenylene ether, polyacetal resin, polybutylene terephthalate, bis(maleimide) triazine resin, polyoxybenzylene resin, polyamino-bis(maleimide)resin, polyphenylene oxide and rubber. The plastic materials have to be formed into a plate rather than a film so as to reduce the waviness of medium surface. For another example, as shown in FIG. 3, the under-layer 2' is formed by covering an elastific film made of plastic material over a substrate having a negligible waviness and made of metal materials such as aluminum alloy, nickel-phosphorus plating film covered aluminum alloy, alumite covered aluminum alloy, titanium alloy and stainless steel, or ceramics such as glass, alumina, alumina-titanium carbide, silicon, germanium, silica and diamond. The medium layer 3' is composed of ceramics of iron oxide, iron nitride or iron carbide compound such as $Fe_3O_4$, $\gamma\text{-}Fe_2O_3$, $Fe_3N_4$, $Fe_5C_2$ and barium ferrite, a single layer of cobalt alloy such as Co, Co-Ni, Co-Ni-P, Co-Mn-P, Co-Mn-Ni-P, Co-Re, Co-Ni-Re, Co-Mn-Re-P, Co-Cr, Co-Fe-Cr, Co-V, Co-Ru, Co-Os, Co-Pt, Co-Ni-Pt, Co-Pt-Cr, Co-Pt-V, Co-Rh, Co-Cr-Rh, Co-Ni-Mo, Co-Ni-Cr, Co-Ni-W and Co-Sm, a multi-layer having a lower metal layer of Cr, Mo or W and a upper layer of cobalt alloy, or metal materials containing iron such as Fe-Mg, Fe-Nd, Fe-Ag, Fe-Pd and Fe-Tb or containing manganese such as Mn-Al and Mn-Cu-Al.

EXAMPLE 1

An under-layer 2' is composed of a multi-layer formed by electroless-plating nickel-phosphorus to cover a substrate made of aluminum alloy, polishing the surface thereof to finish like mirror face, and coating it with polyimide varnish a thickness of 1 μm. A magnetic recording medium material composed of cobalt chromium alloy is sputtered over the under-layer 2' to form a hard disk.

EXAMPLE 2

An under-layer 2' is composed of a multi-layer formed by electroless-plating nickel-phosphorus to cover a substrate made of aluminum alloy, polishing the surface thereof to finish like mirror face, and coating it with silicone rubber a thickness of 1 μm. A magnetic recording medium material composed of cobalt chromium alloy is sputtered over the under-layer 2' to form a hard disk.

EXAMPLE 3

A magnetic medium material composed of cobalt-nickel-phosphorus alloy is electroless-plated over a plastic substrate 2' made of polycarbonate and having a thickness of 2 mm to form a hard disk.

In order to compare the present data storage apparatus with the conventional data storage apparatus of Winchester type, the intermittent drive test of repeating stop and drive operation is carried out with the space dimension of 0.05 μm set. In the Winchester type apparatus, all of the stored data disappear within several numbers of repetition cycle due to the frictional abrasion of medium. On the other hand, in the inventive apparatus, increase of memory defects or errors is not observed at all over the repetition cycles of one million.

In addition, the above described three examples of hard disk are continuously driven to read and write data by the conventional and present apparatuses under the environmental dust level of class one million. In the Winchester type apparatus, the stored data is completely erased due to the head clash, while in the inventive apparatus, increase of memory error is not observed at all after the continuous operation of 1000 hours.

As described above, the present apparatus is considerably effective to prevent the abrasion of medium and head clash.

What is claimed is:

1. An apparatus for magnetically writing or reading data to or from a magnetic recording medium, said apparatus comprising: a magnetic writing/reading head which is movable relative to and opposed to said magnetic recording medium; a displacement sensor for monitoring a spaced between said magnetic head and said magnetic recording medium, said displacement sensor including an optical fiber fixed to said magnetic head and a measurement device for emitting light and receiving a reflection of the light after it is reflected from said magnetic recording medium and transmitted through said optical fiber so as to measure said space according to an intensity of said reflected light; and an actuator for supporting said magnetic head and driven in response to said space monitored by said displacement sensor so as to keep said space between said magnetic head and said magnetic recording medium constant.

2. An apparatus as claimed in claim 1 further comprising a servo-circuit for servo-controlling said actuator in response to said space monitored by said displacement sensor.

3. An apparatus as claimed in claim 1, wherein said actuator includes means for supporting said magnetic head to have a space smaller than 0.2 $\mu$m with the magnetic recording medium.

4. An apparatus as claimed in claim 1, wherein said magnetic head includes a bottom surface opposed to said magnetic recording medium and curved outwardly toward said magnetic recording medium.

5. An apparatus for magnetically writing or reading data to or from a magnetic recording medium, said apparatus comprising: a magnetic writing/reading head which is movable relative and opposed to said magnetic recording medium; a displacement sensor for monitoring a space between said magnetic head and said magnetic recording medium; and an actuator for supporting said magnetic head and driven in response to said space monitored by said displacement sensor so as to keep said space between said magnetic head and said magnetic recording medium constant, said actuator including vibrating means for vibrating said magnetic head in directions to and from said magnetic recording medium at a predetermined frequency which is effective to produce air pressure against said magnetic recording medium which includes an elastic material that is deformable in response to said air pressure applied thereto.

6. An apparatus as claimed in claim 5 further comprising a servo-circuit for servo-controlling said actuator in response to said space monitored by said displacement sensor.

7. An apparatus as claimed in claim 5, wherein said actuator includes means for supporting said magnetic head to have a space which is smaller than 0.2 $\mu$m with the magnetic recording medium.

8. An apparatus as claimed in claim 5, wherein said magnetic head includes a bottom surface opposed to said magnetic recording medium and curved outwardly toward said magnetic recording medium.

* * * * *